United States Patent
Klein et al.

(10) Patent No.: US 9,209,607 B2
(45) Date of Patent: Dec. 8, 2015

(54) DEVICE FOR DISCHARGING AN ELECTRICAL OVERVOLTAGE

(71) Applicant: Pfisterer Kontaktsysteme GmbH, Winterbach (DE)

(72) Inventors: Thomas Klein, Dettingen-Teck (DE); Michael Zerrer, Zell u. A. (DE); Gottfried Leonhardt, Oftersheim (DE)

(73) Assignee: PFISTERER KONTAKTSYSTEME GBMH, Winterbach (DE)

( * ) Notice: Subject to any disclaimer, the term of this patent is extended or adjusted under 35 U.S.C. 154(b) by 0 days.

(21) Appl. No.: 13/261,969

(22) PCT Filed: Apr. 12, 2013

(86) PCT No.: PCT/EP2013/001079
§ 371 (c)(1),
(2) Date: Oct. 8, 2014

(87) PCT Pub. No.: WO2013/159871
PCT Pub. Date: Oct. 31, 2013

(65) Prior Publication Data
US 2015/0036255 A1    Feb. 5, 2015

(30) Foreign Application Priority Data

Apr. 24, 2012   (DE) .......................... 10 2012 008 484

(51) Int. Cl.
*H01T 1/15*     (2006.01)
*H01C 7/12*    (2006.01)
*H01T 4/00*    (2006.01)
*H02H 9/04*    (2006.01)
*H02H 9/06*    (2006.01)

(52) U.S. Cl.
CPC *H01T 1/15* (2013.01); *H01C 7/126* (2013.01); *H01T 4/00* (2013.01); *H02H 9/045* (2013.01); *H02H 9/06* (2013.01)

(58) Field of Classification Search
CPC ............ H01C 7/12; H01C 7/126; H01T 1/15; H01T 4/00
USPC .......................... 361/127, 117–120, 128–132
See application file for complete search history.

(56) References Cited

U.S. PATENT DOCUMENTS

| 2,928,016 A | 3/1960 | Schultz |
| 3,588,578 A | 6/1971 | Clinkenbeard |

(Continued)

FOREIGN PATENT DOCUMENTS

| DE | 35 11 084 A1 | 8/1986 |
| DE | 38 15 666 C2 | 3/1989 |

(Continued)

*Primary Examiner* — Rexford Barnie
*Assistant Examiner* — Toan Vu
(74) *Attorney, Agent, or Firm* — Wenderoth, Lind & Ponack, L.L.P.

(57) ABSTRACT

A device (1) for discharging an electrical overvoltage includes an overvoltage discharge unit (10) having a non-linear current/voltage characteristic at least in sections. A first terminal electrode (16) of the overvoltage discharge unit (10) is connected to a high-voltage terminal (18) of the device (1). A second terminal electrode (22) of the overvoltage discharge unit (10) is connected to a low-voltage or ground terminal (24) of the device (1). The overvoltage discharge unit (10) is surrounded, at least in sections, by an insulating body (20). A cutting element (40) is connected to the low-voltage or ground terminal (24) and is disposed close to a high-voltage section of the overvoltage discharge unit (10). The cutting element cuts into the insulating body (20) when the insulating body (20) distends as a result of an electrical overload, enabling an arc to be sparked and stabilized between the high-voltage section and the cutting element (40).

17 Claims, 7 Drawing Sheets

(56) References Cited

U.S. PATENT DOCUMENTS 4,686,603 A * 8/1987 Mosele .................. 361/118
5,191,503 A    3/1993 Kawamura et al.
2011/0304945 A1* 12/2011 Podporkin et al. ............ 361/117

FOREIGN PATENT DOCUMENTS

EP    1 821 320 A1    8/2007
EP    2 124 305 A1    11/2009

* cited by examiner

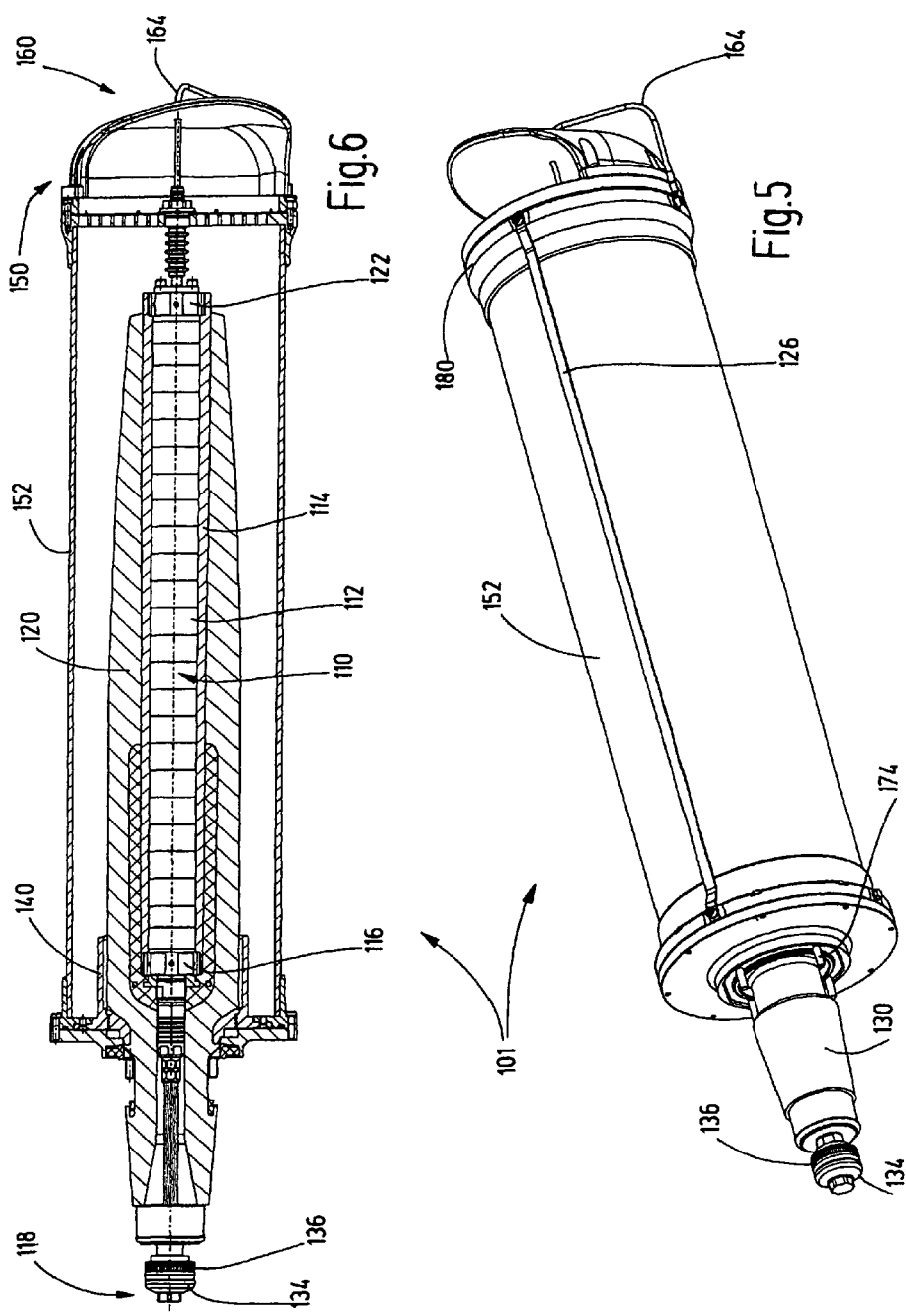

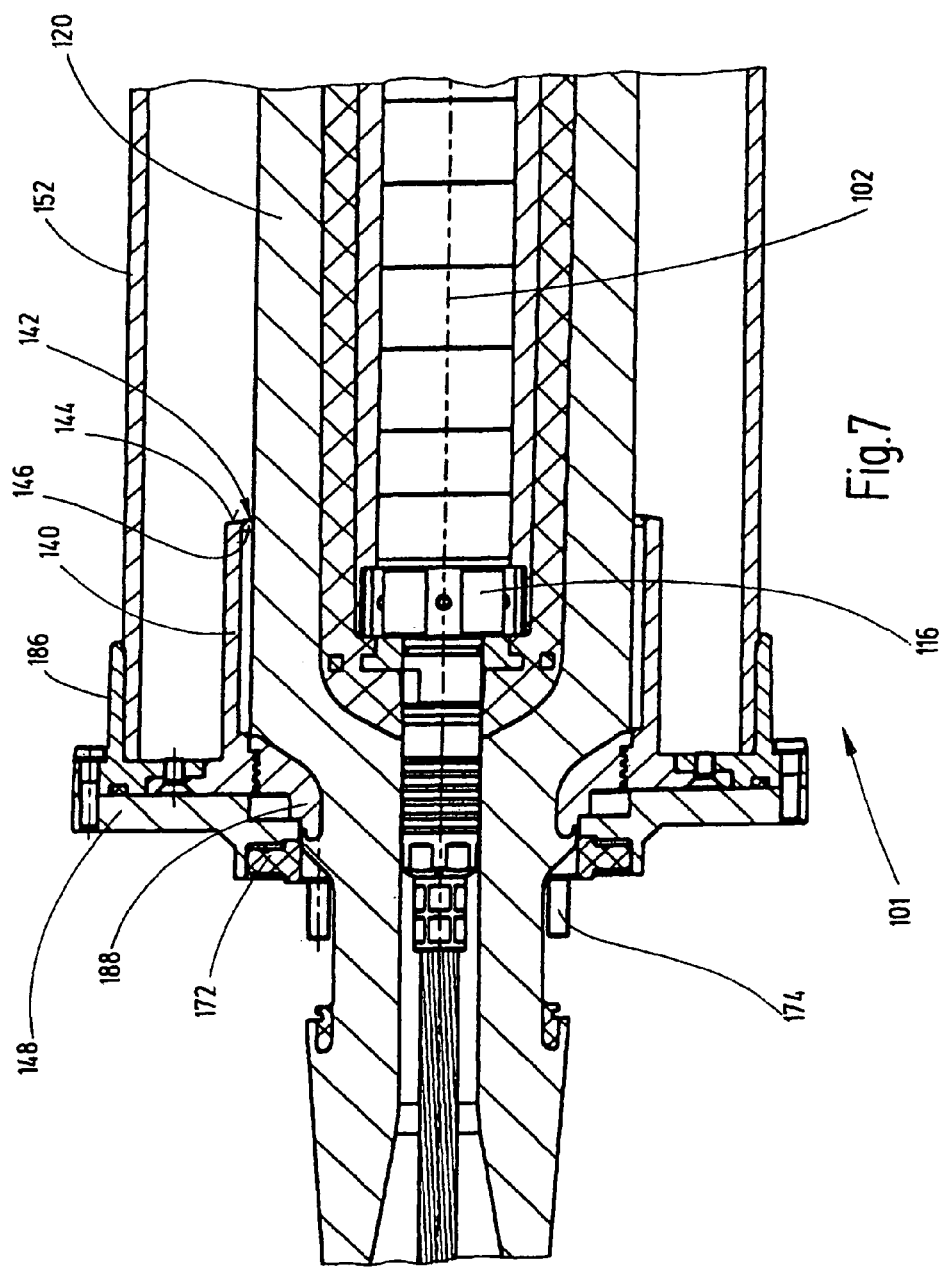

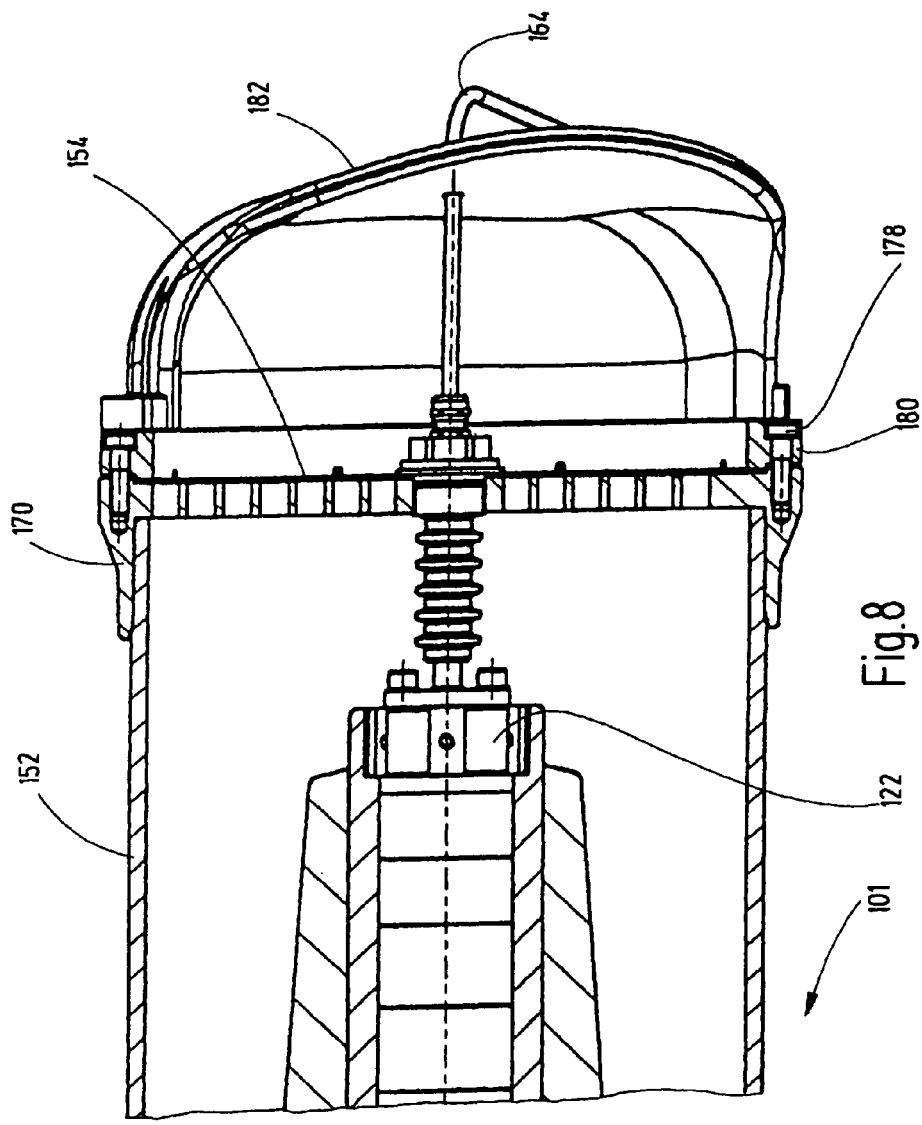

DEVICE FOR DISCHARGING AN ELECTRICAL OVERVOLTAGE

FIELD OF THE INVENTION

The invention relates to a device for discharging an electrical overvoltage, in particular to a pluggable overvoltage arrester having a solid insulation.

BACKGROUND OF THE INVENTION

Electrical high-voltage energy supply networks are exposed not only to the constantly present operating voltage, but also to overvoltages, against which the energy supply networks are only conditionally insulated. Overvoltage arresters limit transient overvoltages, in particular, to values that are harmless to the insulation of the operating mechanism and are therefore usually used. The use of such overvoltage arresters is particularly important, for example, to protect transformers or busbars of gas-insulated switchgear (GIS). Because these operating mechanisms are cost-intensive, damage must be prevented, if possible, since damage resulting from overvoltage can result in a power failure.

Pluggable overvoltage arresters, such as those known from DE 38 15 666 C2, for example, have already been used in medium-voltage systems. Arresters that are encapsulated and filled with a highly pressurized insulating gas, for example sulfur hexafluoride (SF6), have been used so far for high-voltage applications having operating voltages greater than 50 kV.

SUMMARY OF THE INVENTION

The problem addressed by the invention is that of providing a device of the type in question that has high operational reliability even when used in high-voltage energy supply systems. In particular, the risk of danger and damage should also be minimal in the event of an electrical overload of the device.

In one embodiment, the problem is solved by a device for discharging an electrical overvoltage, comprising an overvoltage discharge unit having a non-linear current/voltage characteristic at least in sections. A first terminal electrode of the overvoltage discharge unit is connected to a high-voltage terminal of the device. A second terminal electrode of the overvoltage discharge unit is connected to a low-voltage or ground terminal of the device. The overvoltage discharge unit is surrounded, at least in sections, by an insulating body. The device has a cutting element connected to the low-voltage or ground terminal of the device and is disposed close to a high-voltage section of the device, in particular close to a high-voltage section of the overvoltage discharge unit. The cutting element cuts into the insulating body in the event of the insulating body distending (i.e., expanding from internal pressure) as a result of an electrical overload of the device to enable an arc to be sparked and stabilized between the high-voltage section and the cutting element. In particular, the device is stabilized in the region between the high-voltage section and the cutting element until the electrical voltage overload is shut off by an electrical disconnecting device provided separately from the device. The length of the thusly stabilized arc can be less than the diameter of the cutting element, in particular less than the diameter of a preferably circular, enclosing cutting edge of the cutting element, and preferably less than 80% or even less than 70% of this diameter.

In one embodiment, the insulating body is an elastically deformable, solid insulating body made of a silicone rubber, in particular, and has a preferably centrally continuous opening in the longitudinal direction for accommodating the overvoltage discharge unit. The insulating body can have an outer shape on its outer surface that is cylindrical or, in particular, tapers toward the end on the low-voltage side. On the inner side thereof, the insulating body can have electrical conductivity in regions, in particular in the section dedicated to the high-voltage side of the overvoltage discharge unit to form a field-control element, for example. The insulating body can have an inner width in the region for accommodating the overvoltage discharge unit that is less than the outer diameter of the overvoltage discharge units such that the insulating body bears tightly against the overvoltage discharge unit as a result of the elastic deformation thereof.

The device can be pluggable. The insulating body can also have an integral section such that, when the device is plugged in, the integral section comes to bear tightly against the associated socket body and forms an electrical high-quality joint with the socket body. The device can be used for operating voltages greater than 50 kV, in particular greater than 70 kV, and preferably greater than 120 kV.

The overvoltage discharge unit can be formed by a voltage-dependent resistor, a varistor. The electrical resistance of the varistor is voltage-dependent and diminishes, in particular starting at a threshold voltage, to the extent that the resultant current flow enables overvoltages to be reduced. In one embodiment, the overvoltage discharge unit comprises a plurality of varistors connected in series, for example disk-shaped metal-oxide varistors. The varistors are preferably braced by fiber-reinforced, in particular glass fiber-reinforced, plastic rods to form a stack, are preferably arranged in the shape of cylinder and, in particular, are filled with a curable, liquid silicone insulating material and are encapsulated without air pockets.

To ensure reliable operation of the discharge device, this discharge device must withstand the overvoltage that occurs until a separate electrical disconnecting device engages. In the event that such high-energy overvoltages occur, the insulating body can distend as a result of an electrical overload of the device. In particular, thermal overloads resulting from high-energy overvoltages can induce changes in the voltage characteristics of individual varistors, causing them to become permanently conductive or short-circuited. Arcs can form in the resultant short-circuit current paths, which arcs cause the insulating body to distend due to the resultant gas pressure. In known devices, this distending can cause the entire device to burst open and can result in an uncontrolled formation of a relatively long and, therefore, high-energy arc causing damage to the surrounding parts of the system. In the solution according to the invention, the cutting element cuts into the insulating body and, if necessary, cuts into the insulating body. Given that the cutting element is disposed close to a high-voltage section of the device, a relatively short arc forms, having correspondingly low energy that moreover occurs at a location that is predetermined by the geometry of the device. The preferably annularly disposed cutting edge forms a tip, by means of which the distending insulating body can be cut open and by means of which a metallic consumable electrode can be provided on which the root of the arc on the ground side can be stabilized. Reliably preventing the entire device from bursting open is then possible, which bursting open would endanger persons or cause damage to surrounding parts of the system.

In one embodiment, the cutting element has a cutting edge having a cutting angle of less than 60°, in particular less than 45°, and preferably less than 30°. The cutting edge can be substantially circular and can enclose the entire insulating body. The cutting edge can be formed by two cutting flanks extending toward one another in the direction of the insulating body at an acute angle. One of the two cutting flanks can be oriented at a right angle to the longitudinal axis of the cutting element, wherein the longitudinal axis of the cutting element can coincide with the longitudinal axis of the overvoltage discharge unit and/or the longitudinal axis of the device. The second cutting flank can be curved, for example having the shape of a spherical surface.

In one embodiment, the cutting element, in particular a cutting edge of the cutting element, can be spaced apart from the insulating body in the regular operating state of the device. As a result, the insulating body is reliably prevented from becoming damaged by the cutting edge upon installation. As a result, cutting into or severing the insulating body in the event of malfunction is easier, since the cutting edge cuts into the outer surface of the insulating body at a higher rate of speed.

In one embodiment, a cutting edge of the cutting element is disposed, relative to a longitudinal axis of the device, in the region of the overvoltage discharge unit, in particular in the region of the end of the overvoltage discharge unit on the high-voltage side. This arrangement has proven to be particularly advantageous if the cutting edge is not disposed directly at the terminal of the overvoltage discharge unit on the high-voltage side, but rather at an axial distance therefrom that corresponds to between 20 and 500% of the diameter of the discharge unit, in particular between 40 and 300% and preferably between 50 and 200%, or at a distance that approximately corresponds to the axial length of one of the plurality of varistor elements. As a result, an arc forms, having a defined position and length, in the event of a malfunction.

In one embodiment, the cutting element also comprises a preferably integrally formed flanged socket for accommodating an insulating tube enclosing the insulating body. The flanged socket can have a corrugation, by which the insulating tube can be bonded with the cutting element. The inner width in the region of the flanged socket is greater than the inner width of the cutting element. For example, the inner width can be between 120 and 250% of the inner width of the cutting element in the region of the cutting edge.

The insulating tube forms a part of the housing of the device. The insulating tube can be radially spaced apart from the insulating body such that a void is maintained between the insulating body and the insulating tube in the interior of the device. The insulating body can expand into the void in the event of an electrical overload without the housing and, in particular, the insulating tube of the device bursting open and endangering persons or surrounding parts of the system. The insulating tube is made of an electrically insulating material, in particular of a plastic, preferably of a fiber-reinforced and, in particular, glass fiber-reinforced plastic.

In one embodiment, the device comprises a pressure relief device on the end thereof opposite the high-voltage terminal. The gas pressure produced inside the device in the event of an electrical overload can escape via the pressure relief device, thereby ensuring that the insulating tube can remain intact. The pressure relief device relieves pressure by a gas flow initially moving in the axial direction along the longitudinal direction of the device and preferably emerging at the end of the device on the low-voltage side. Damage is thereby also reliably prevented, in particular, to the part of the system on which the device is mounted.

In one embodiment, the pressure relief device comprises a retaining element for preventing particles larger than a certain size from exiting the device. The retaining element can be formed, for example, by a perforated plate closing the housing of the device in the axial direction. The perforated plate can close the insulating tube in the axial direction, in particular. The retaining element can comprise, preferably in the center, a support for the overvoltage discharge unit, for example including an electrical passage for the connection of the discharge unit on the low-voltage side. The pressure relief device can comprise a closure element that can burst open in the event of an electrical overload. For example, a membrane bears against the retaining element, in particular a metallic membrane that reliably prevents moisture from entering the device during regular operation.

In one embodiment, the device comprises a redirection device that allows gas flow emerging from the housing in the event of an electrical overload of the device to be redirected into a specifiable direction. The redirection device can be mounted on the housing of the device, in particular on the pressure relief device, for example on the axial end thereof, and can be designed, for example, in the shape of a hood having a radial exit opening. The direction of the gas flow emerging from the device in the event of a malfunction can be defined by the selected rotary position of the redirection device.

In one embodiment, the high-voltage terminal and the low-voltage or ground terminal of the device are disposed on a common axial side. To this end, the second terminal electrode of the overvoltage discharge unit is connected to the low-voltage or ground terminal of the device by a grounding cable extending in the longitudinal direction of the device. This low-voltage or ground terminal is disposed at or close to the same axial end of the device as the high-voltage terminal. The grounding cable can extend along the housing in the form of a grounding rail that can also melt in the event of an electrical overload and that can be detachably mounted on the device. A further electrical unit can be connected or interconnected between the low-voltage terminal of the overvoltage discharge unit and the grounding cable, for example a pulse counter, that counts the events of overvoltages that occur.

In one embodiment, the device comprises a fastening mechanism, in particular a fastening flange detachably mounted on the device, in particular being connected to the cutting element directly or indirectly, for example by having a connecting element installed therebetween. As a result, the device can be adapted to the various structural details of the electrical system in a simple and modular manner. In addition, in the event that the device is damaged in the region of the overvoltage discharge unit as the result of an electrical overload, only the defective components need to be replaced and, in particular, any intact components still remaining can continue to be used.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 5 is a perspective view of a device for discharging an electrical overvoltage according to a second exemplary embodiment of the invention;

FIG. 6 is a side elevational view in section of the device of FIG. 5;

FIG. 7 is an enlarged, partial side elevational view in section of a portion of FIG. 6;

FIG. 8 is an enlarged, partial side elevational view in section of another portion of FIG. 6.

DETAILED DESCRIPTION OF THE INVENTION

Figure 1:
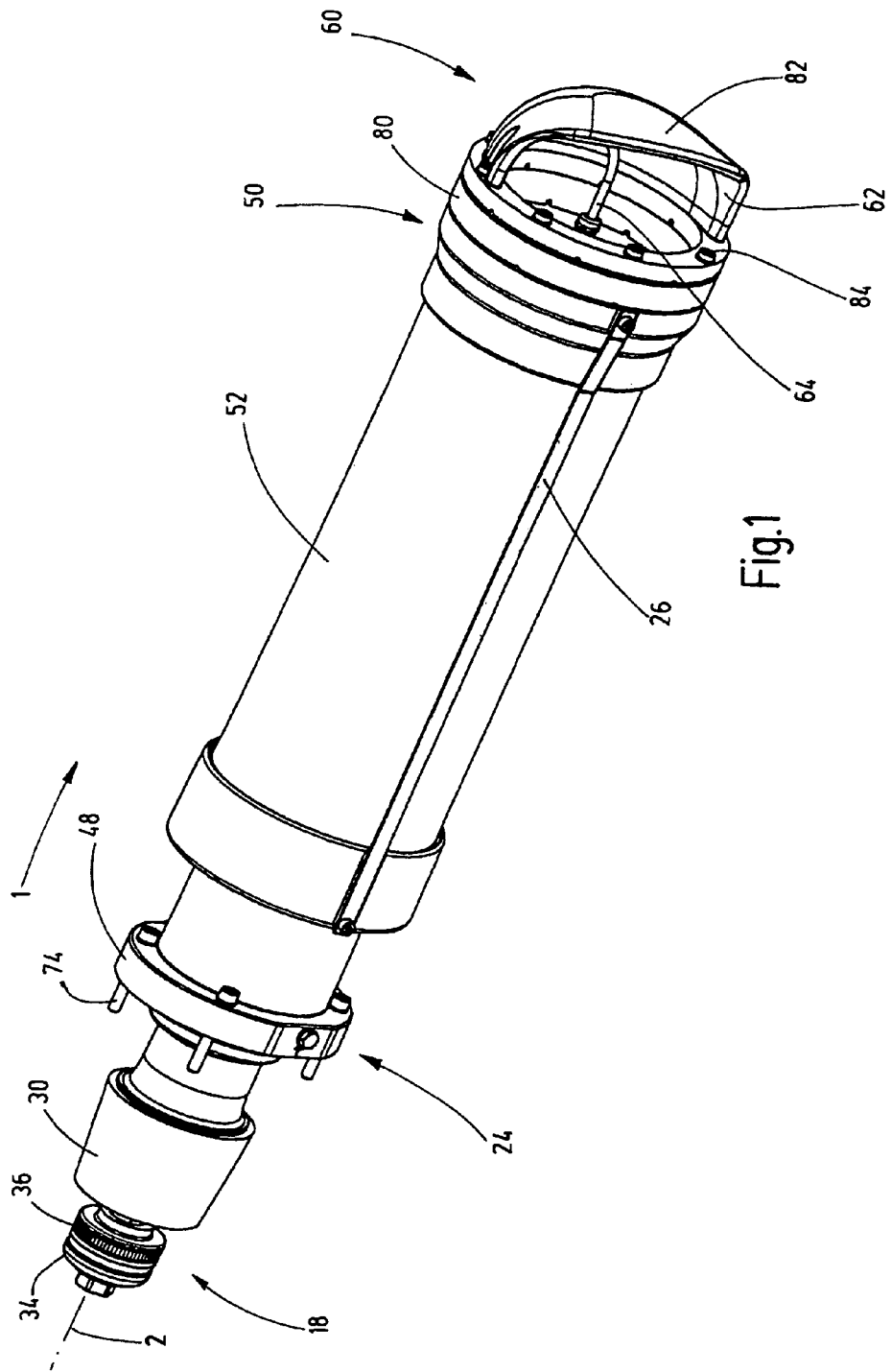
FIG. 1 is a perspective view of a device for discharging an electrical overvoltage according to a first exemplary embodiment of the invention.
Figure 2:
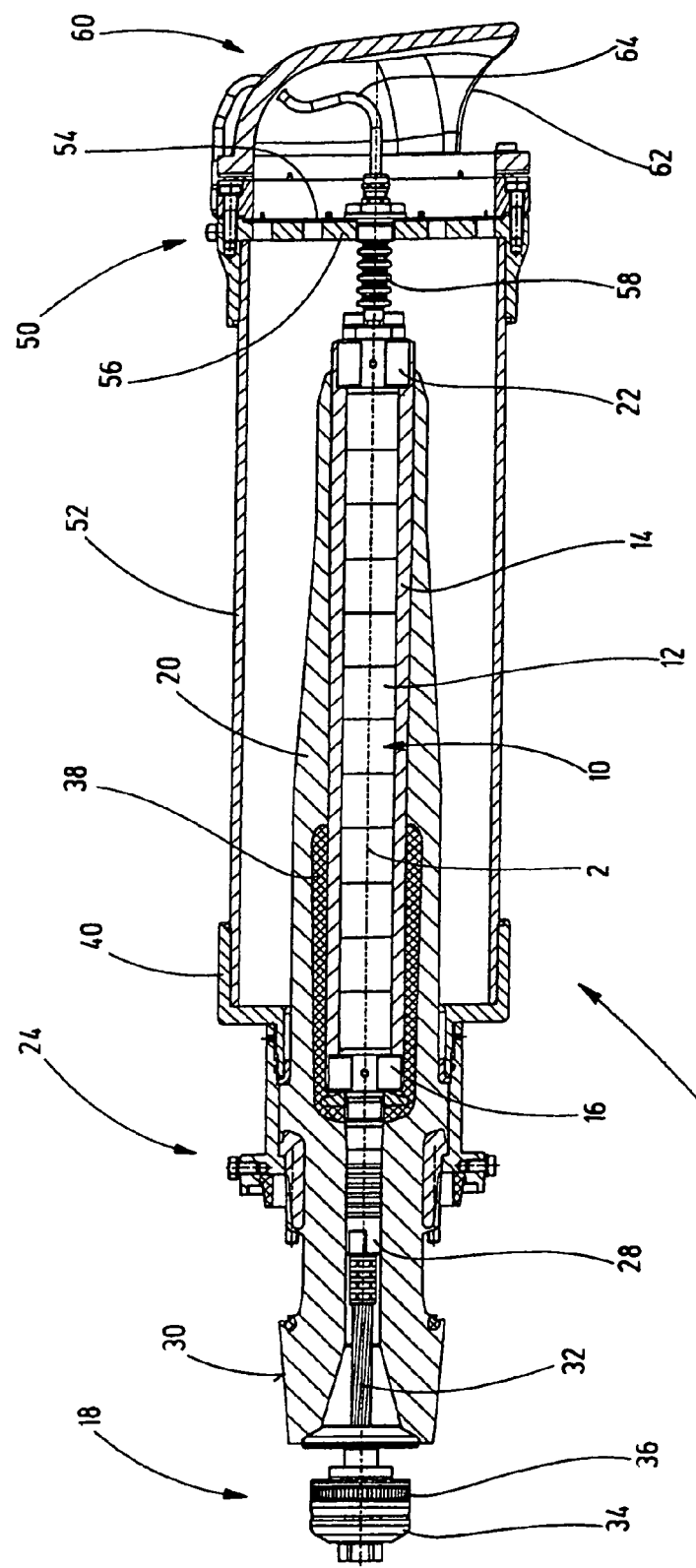
FIG. 2 is a side elevational view in section of the device of FIG. 1.

FIG. 1 shows a perspective view of a first exemplary embodiment of a device 1 according to the invention, while FIG. 2 shows a longitudinal view through the device 1 for discharging an electrical overvoltage, comprising an overvoltage discharge unit 10 having a non-linear current/voltage characteristic. In the exemplary embodiment, the device 1 is formed of a plurality of varistors 12 made of a metal-oxide material, disposed one behind the other, electrically connected in series, and shaped as disks or circular-cylindrical bodies. The varistors are stacked in an insulating cylinder 14. Cylinder 14 preferably has a smooth and round surface, such that varistors 12 are centered between the terminal electrodes 16, 22, mechanically loaded against one another, and encapsulated without air gaps. A first terminal electrode 16 of the overvoltage discharge unit 10 is connected to a high-voltage terminal 18 of the device 1. A second terminal electrode 22 of the overvoltage discharge unit 10 is connected to a low-voltage or ground terminal 24 of the device 1. The electrical connection between the low-voltage or ground terminal 24 of the device 1 and the second terminal electrode 22 of the overvoltage discharge unit 10 is implemented, inter alia, by a grounding cable 26 extending along the outer side of the device 1 and parallel to the longitudinal axis 2 thereof. As a result, the high-voltage terminal 18 and the low-voltage or ground terminal 24 of the device 1 are disposed on a common axial side of the device 1. In particular, the ground terminal 24 of the device 1 can be implemented by the mechanical fixation of the device 1 on the system part to be connected.

In the exemplary embodiment shown, the overvoltage discharge unit 10 is nearly completely enclosed, at least in sections, by an insulating body 20. The insulating body 20 is made of an elastically deformable silicone rubber and comprises a through-opening. The inner width of insulating body 20 is slightly smaller, in the region of the overvoltage discharge unit 10, than the outer diameter of the overvoltage discharge unit 10, in particular slightly smaller than the outer diameter of the insulating cylinder 14, such that the insulating body 20 bears tightly against the overvoltage discharge unit 10.

The electrical contacting of the first terminal electrode 16 is implemented with a press connection 28. In the region of connection 28, the through-opening of the insulating body 20 has a reduced diameter and bears tightly against the press connection 28. The terminal is routed out of the insulating body 20 via a preferably strand-type cable 32, and is accommodated by a contact ring 34 outside of the insulating body 20. Contact ring 34 has a multi-line contact 36, for example, on the outer peripheral surface thereof. In the region of the strand-type cable 32, the insulating body 20 has an outer cone 30 that can be brought to bear tightly against a socket body (not illustrated) associated with the plug-in contact and that forms a high-voltage resistant, electrical high-quality joint as a result of the elastic deformation of the insulating body 20.

In the region of the end of the overvoltage discharge unit 10 on the high-voltage side, the insulating body 20 comprises, on the inner side thereof, an electrically conductive section 38. Section 38 can be electrically installed on the overvoltage discharge unit 10, is produced, for example, by enriching the silicone rubber accordingly with electrically conductive particles, and serves the function of preventing field strength peaks in this region.

In the region of the electrically conductive section 38, the device 1 comprises a cutting element 40. Cutting element 40 is connected to the low-voltage or ground terminal 24, is disposed close to the high-voltage section of the device 1, in particular close to the high-voltage section of the overvoltage discharge unit 10, and cuts into the insulating body 20 in the event of the insulating body 20 distending as a result of an electrical overload of the device 1. This cutting enables an arc to be sparked and stabilized between the high-voltage section, for example the first terminal electrode 16, and the cutting element 40.

The device 1 comprises a pressure relief device or valve 50 on the axial end thereof opposite the high-voltage terminal. The cutting element 40 as well as the pressure relief device 50 each comprises a section in the shape of a flanged socket. A hollow cylindrical insulating tube 52 produced of a glass fiber-reinforced plastic is disposed between the two flanged socket-shaped sections. Insulating tube 52 forms the cylindrical jacket of the housing of the device 1 and covers the insulating body 20 toward the outside. The housing is sealed at the ends by a membrane 54, in particular by a metallic membrane. Membrane 54, together with a retaining element 56 in the form of a perforated plate in this exemplary embodiment, is a component of the pressure relief device 50. In the event of an electrical overload of the device 1 and a resultant distension of the insulating body 20, which is spaced apart from the insulating tube 52 in the regular operating state, the overpressure that forms can escape axially by virtue of the fact that the membrane 54 bursts. The retaining element 56 retains particles that exceed a specifiable dimension of 15 mm, for example.

A redirection device or redirector 60 is disposed on the end of the device 1. The redirection device 60 has an exit opening 62. Gas flow emerging in the event of an overload can be redirected relative to the longitudinal axis 2 of the device 1 by the redirection device 60.

The electrical contacting of the second terminal electrode 22 is implemented via an electrical cable in a central insulating sleeve 58. That electrical cable is also routed through the retaining element 56 and, in the region of the redirection device 60, is further routed radially outwardly onto the jacket surface of the device 1 and, from there, along the insulating tube 52 to the terminal 24 on the low-voltage side.

The cross-section of the grounding cable 26 and/or of the low-voltage or ground terminal 24 of the device 1 is dimensioned such that each can be interrupted, in particular via melting or burning-through, thereby interrupting the current flow, if a short-circuit current occurs due, in particular, to a thermal overload of the varistors 12. The value of the short-circuit current inducing the interruption can be predetermined, for example, on the basis of the material and/or the geometric dimensions of the grounding cable 26 and/or of the low-voltage or ground terminal 24. As a result of the interruption of the ground connection of the second terminal electrode 22, in particular due to the grounding cable 26 having been severed, and, in particular, in interaction with the insulating housing 52, the short arc that is sparked on the cutting element 40 can stabilize only in the region of the cutting element 40 and, in particular, cannot propagate along the stack of varistors 12.

The grounding cable 26 can also be detachably connected to the cutting element 40 in a mechanical and electrical manner, if necessary. The associated electrical connection point and/or a section of the grounding cable 26 adjacent to the connection point or adjoining the connection point can be configured, for example via a local reduction of the cross-section of the grounding cable 26. In the event of an overload, the interruption of the ground connection then occurs in this region, thereby ensuring that the ground potential is substantially present only up to the axial end of the cutting element 40. The arc then can only stabilize there and, in particular, cannot propagate along the stack of the varistors 12.

Figure 3:
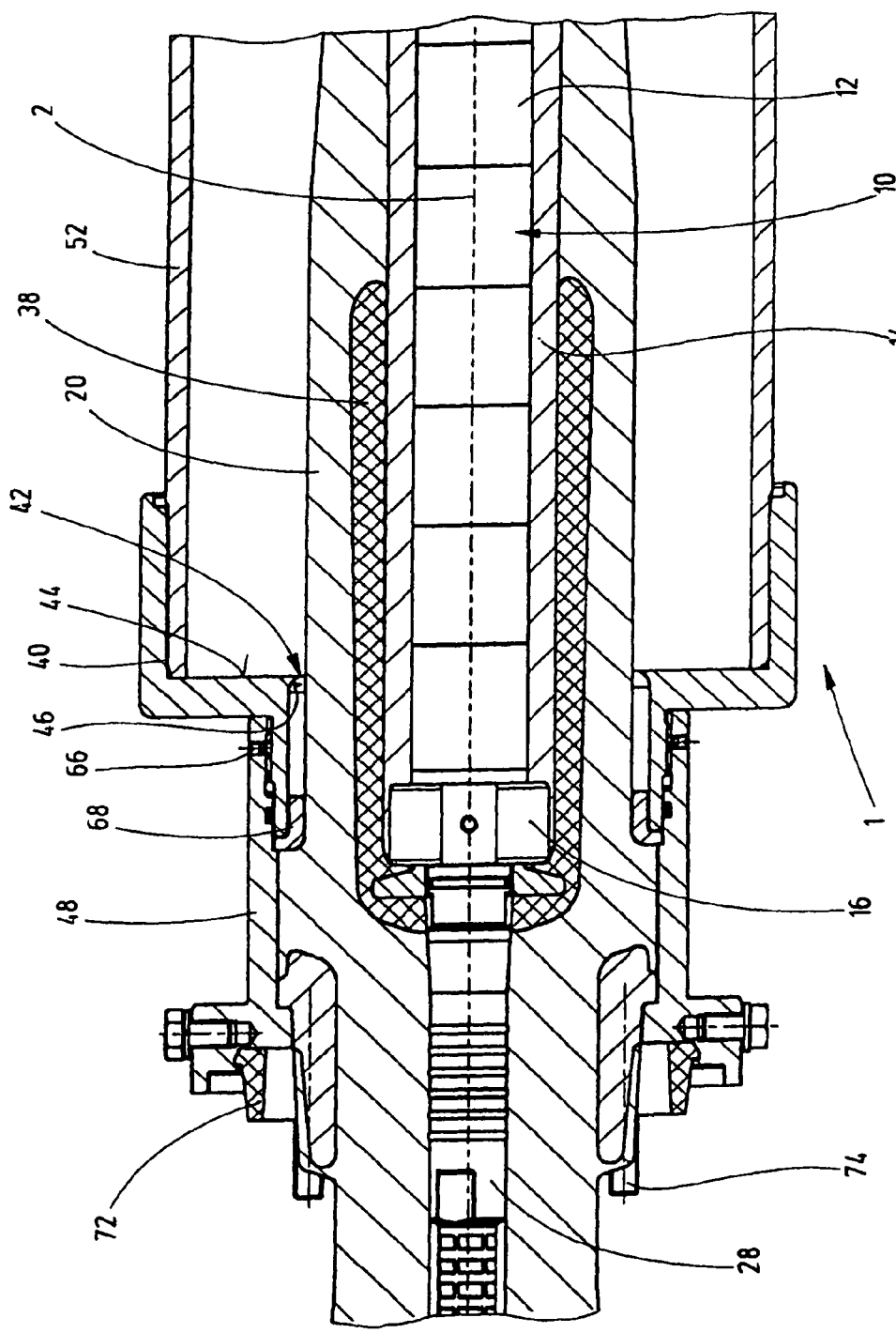
FIG. 3 is an enlarged, partial side elevational view in section of a portion of FIG. 2.

FIG. 3 shows, in an enlarged depiction, the longitudinal view through the device 1 in the region of the first terminal electrode 16 of the overvoltage discharge unit 10. In the regular operating state depicted, the cutting edge 42 of the cutting element 40 is radially spaced apart from the insulating body 20. The cutting edge 42 has an annular extension. The cutting edge 42 is formed where a first cutting flank 44 and a second cutting flank 46 meet. The first cutting flank 44 extends at a right angle to the longitudinal axis 2 of the overvoltage discharge unit 10, which is also the longitudinal axis of the device 1. The second cutting flank 46 is located closer to the first terminal electrode 16 and is spherical. As a result, the cutting edge 42 has a cutting angle of less than 30° in the exemplary embodiment.

The cutting element 40 has, on its side thereof facing the second terminal electrode 22, in particular on the axial end thereof, a flanged socket-shaped section having corrugation transverse to the longitudinal axis. A first end section of the insulating tube 52 is bonded in a form-fit and non-positive manner in that flanged socked-shaped section. On the axial end of cutting element 40 facing the first terminal electrode 16, the cutting element 40 also comprises a flanged socket-shaped section having a smaller diameter. That small section can be inserted or screwed into a tube flange 48 and can be mechanically fixed there and electrically connected to the tube flange 48 by threaded pins 66. A tubular element 68 is inserted on the axial end of the cutting element 40 to affix the insulating body 20 and ensure that the insulating body 20 is radially separated from the cutting edge 42.

On the axial end of flange tube 48 opposite the cutting element 40, the tube flange 48 forms a receiving opening for a sealing element 72. By sealing element 72 the tube flange 48 and, therefore, the device 1 can be mounted tightly against an electrical system part. For mounting purposes, the tube flange 48 has through-openings for fastening screws 74.

Figure 4:
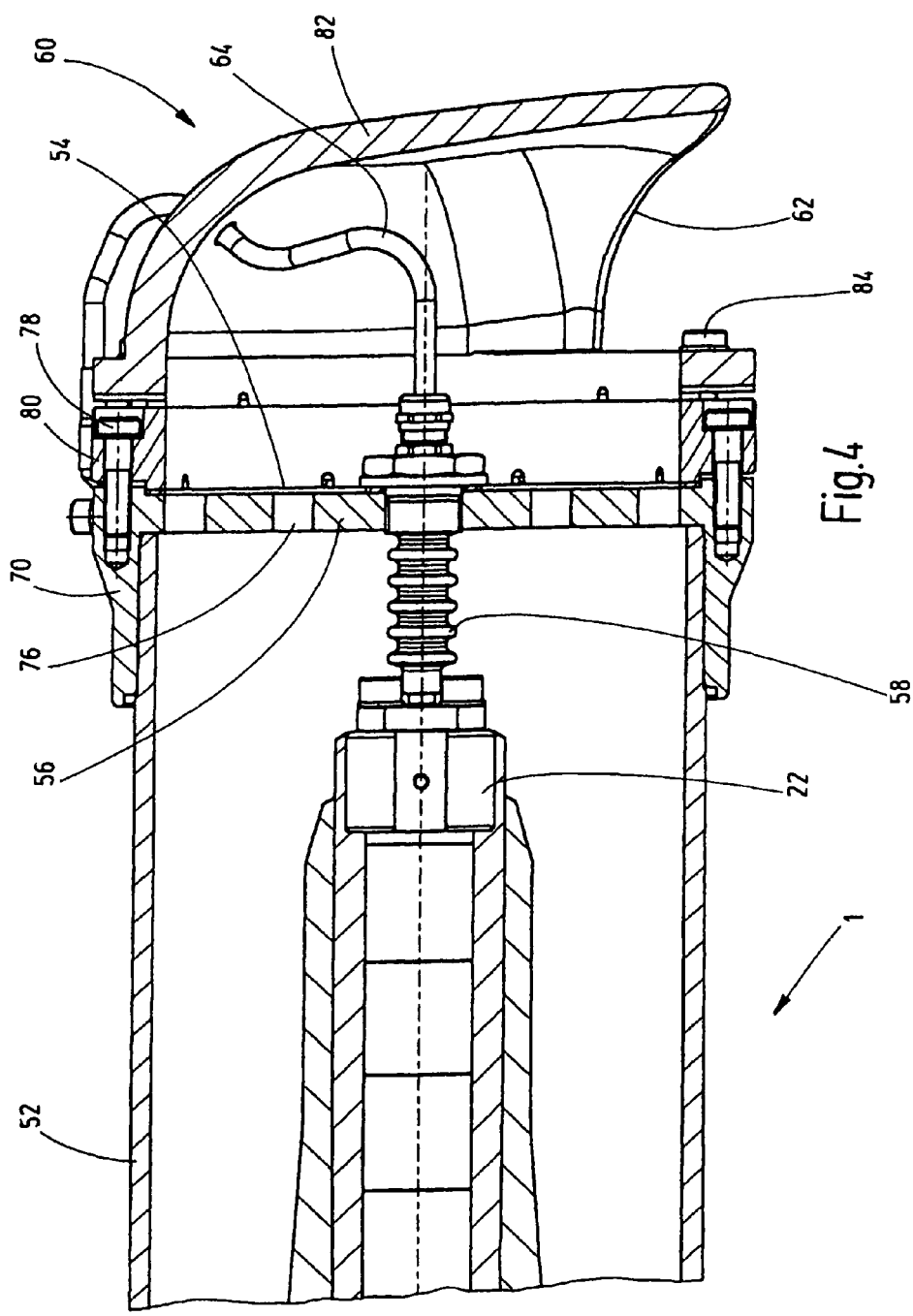
FIG. 4 is an enlarged, partial side elevational view in section of another portion of FIG. 2.

FIG. 4 shows an enlarged depiction of the longitudinal view of the device 1 in the region of the second terminal electrode 22. An end cap 70 of the pressure relief device 50 is screwed onto the axial end of the device 1. The end cap 70 also integrally forms the retaining element 56 with the axial through-openings 76 thereof. In the regular operating state depicted, the interior of the device 1 enclosed by the insulating tube 52 is closed at the axial ends by a membrane 54 placed on the retaining element 56 and tightly connected to the end cap 70 at the edge. In the event of an electrical overload, the overpressure enclosed in the insulating tube 52 can be directed axially outward by virtue of the fact that the membrane 54 bursts. The emerging gas flow can be redirected in the radial direction by the redirection device 60 on the end and by the exit opening 62 located on one side of the redirection device. The membrane 54 is fixed by a ring element 80 fastened on the end cap 70 by screws 78 and can be replaced, if necessary. The redirection hood 82 of the redirection device 60 can also be detachably mounted on the device 1 by screws 84. The redirection hood 82 can be mounted on the ring element 80 in different orientations such that the direction of the emerging gas flow can be adjusted even in the installed state of the device 1.

FIG. 5 shows a perspective view of a second exemplary embodiment of a device 101 according to the invention. FIG. 6 shows a longitudinal view through the second exemplary embodiment. FIG. 7 shows, in an enlarged depiction, a section of the longitudinal view of FIG. 6 in the region of the first terminal electrode 116. FIG. 8 shows, in an enlarged depiction, a section of the longitudinal view of FIG. 6 in the region of the second terminal electrode 122. In terms of the substantial similarities between the second exemplary embodiment of FIGS. 5 to 8 and the first exemplary embodiment of FIGS. 1 to 4, reference is made to the description in respect of these similarities, and reference signs increased by 100 used accordingly in FIGS. 5 to 8.

One difference of the second exemplary embodiment according to FIGS. 5 to 8 as compared to the first exemplary embodiment according to FIGS. 1 to 4 has to do with the shape of the cutting element 140. Whereas the cutting element 40 in the first exemplary embodiment integrally forms a tube flange for the insulating tube 52 and engages it via a flanged-socket section into the tube flange 48, the cutting element 140 in the second exemplary embodiment is substantially sleeve-shaped in the section thereof that forms the cutting edge 142. The first cutting flank 144 forms an acute angle with the longitudinal axis 102 of preferably less than 90°, in particular between 70 and 88°. The second cutting flank 146 is formed by a spherical surface. On the axial end opposite the cutting edge 142, the cutting element 140 is widened in the manner of a flange. In the flange region, cutting element 140 is connected to an inner flange of a neck section 186, in particular being screwed thereon. The neck section 186 has an internal thread that can be screwed together with an external thread on the axial end of the insulating tube 152. The cutting element 140 is connected, radially on the inside, to a centering element 188 that can be brought to bear against the insulating body 120. The tube flange 148 is screwed onto the interconnection of the cutting element 140 and the neck section 186 on the axial end thereof. Tube flange 148 has a receiving opening for a sealing element 172 and can be mounted on the electrical system part by fastening screws 174.

Another difference of the second exemplary embodiment is that the electrical cable 164 is routed centrally and in the axial direction through the redirection hood 182 to connect the second terminal electrode 122 to the low-voltage or ground terminal of the device 101 and, from there, is routed initially substantially radially outwardly to the level of the periphery of the insulating tube 152 and, from there, in the axial direction to the ring element 180.

The axial length of the device 101 of the second exemplary embodiment of the tube flange 148 to the redirection hood 182 is approximately 1.65 m, given a diameter of the tube flange 148 of approximately 40 cm. The corresponding length in the first exemplary embodiment is approximately 1 m and the diameter of the tube flange 48 is approximately 20 cm. The first exemplary embodiment is suitable for rated voltages of up to 72.5 kV, while the rated voltage of the second exemplary embodiment is at most 145 kV.

While various embodiments have been chosen to illustrate the invention, it will be understood by those skilled in the art that various changes and modifications can be made therein without departing from the scope of the invention as defined in the appended claims.

What is claimed is:

1. A device for discharging an electrical overvoltage, comprising:
   an overvoltage discharge unit having a non-linear current/voltage characteristic at least in sections thereof;
   a first terminal electrode of said overvoltage discharge unit connected to a high-voltage terminal;
   a second terminal electrode of said overvoltage discharge unit connected to one of a low voltage or ground terminal;
   an insulting body surrounding said overvoltage discharge unit at least in said sections thereof; and
   a cutting element electrically connected to said one of said low voltage or ground terminal and disposed close to a high voltage section of said overvoltage discharge unit, said cutting element having a cutting edge positioned relative to said insulating body to cut into said insulating body when said insulating body distends as a result of an electrical overload to enable an arc to be sparked and stabilized between said high voltage section and said cutting element.

2. A device according to claim 1 wherein said cutting edge has a cutting angle of less than 60°.

3. A device according to claim 2 wherein said cutting angle is less than 45°.

4. A device according to claim 2 wherein said cutting angle is less than 30°.

5. A device according to claim 1 wherein said cutting edge is spaced apart from said insulating body in a regular operating state of the device.

6. A device according to claim 1 wherein said cutting edge is along a longitudinal axis of the device in an end region of said overvoltage discharge unit at said high voltage section.

7. A device according to claim 1 wherein said cutting element comprises an integrally formed flanged socket receiving an insulating tube enclosing said insulating body.

8. A device according to claim 1 wherein a pressure relief valve is on an end of the device opposite said high voltage terminal.

9. A device according to claim 8 wherein said pressure relief valve comprises a retaining element with a perforated plate closing a housing in an axial direction preventing exit of particles larger than a predetermined size.

10. A device according to claim 1 wherein a redirector is coupled to a housing receiving said overvoltage discharge unit and said insulating body, said redirector controlling gas flow in a specifiable direction from said housing upon an electrical overload of said overvoltage discharge unit.

11. A device according to claim 1 wherein said high voltage terminal and said one of said low voltage or ground terminal are disposed on a common axial side of the device.

12. A device according to claim 11 wherein said second terminal electrode is connected to said one of said low voltage or ground terminal by a grounding cable extending in a longitudinal direction of the device.

13. A device according to claim 1 wherein a fastening flange is detachably connected to said cutting element at least one of directly or indirectly.

14. A device according to claim 13 wherein a neck-shaped connecting element is between said fastening flange and said cutting element.

15. A device according to claim 1 wherein said cutting edge extends radially relative to a longitudinal axis of said insulating body.

16. A device according to claim 15 wherein said cutting edge faces and is located adjacent an outside surface of said insulating body.

17. A device according to claim 1 wherein said cutting edge faces and is located adjacent an outside surface of said insulating body.

* * * * *